June 13, 1944. E. GOETZ 2,351,330
FOOD TREATING AND JUICE EXTRACTING APPARATUS
Filed March 28, 1940 2 Sheets-Sheet 1
FIG.I.
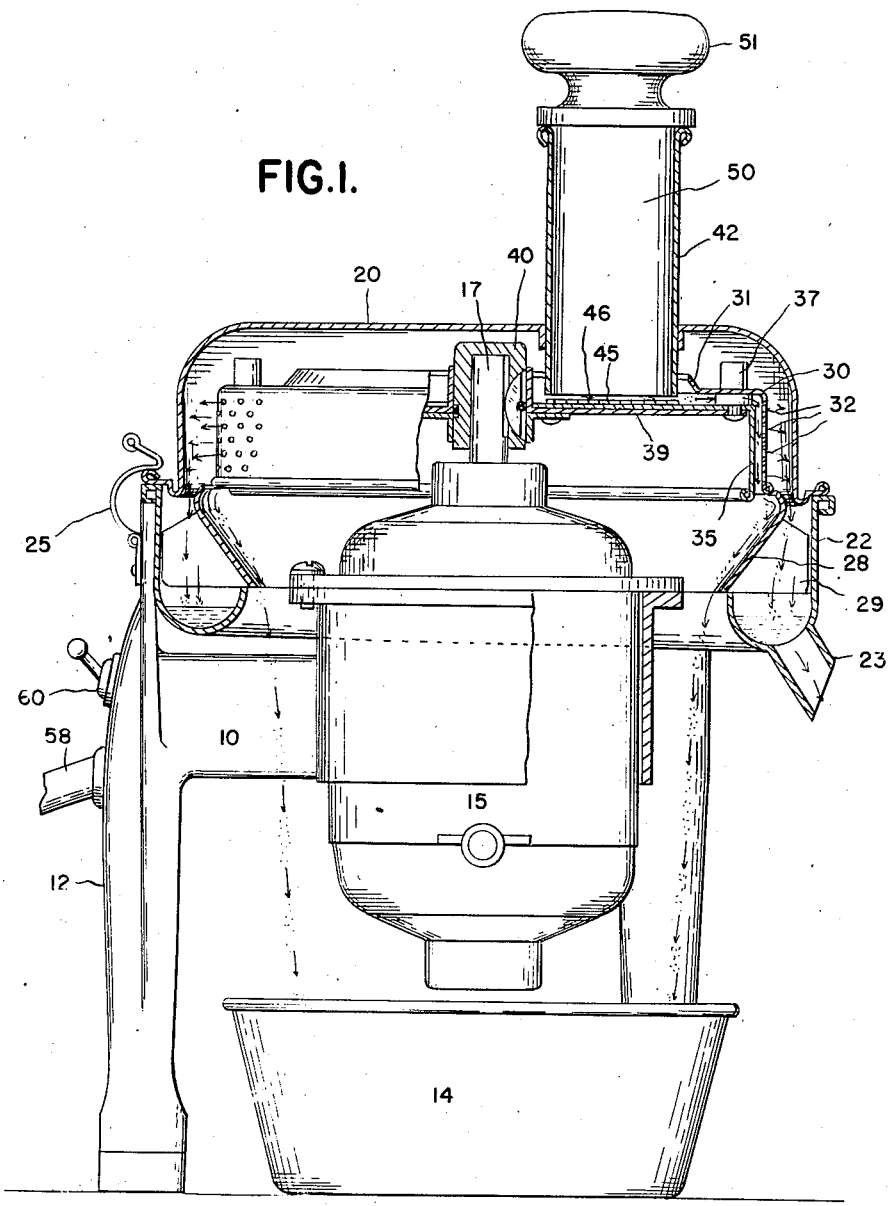
INVENTOR.
EMIL GOETZ
BY
ATTORNEYS June 13, 1944.   E. GOETZ   2,351,330
FOOD TREATING AND JUICE EXTRACTING APPARATUS
Filed March 28, 1940   2 Sheets-Sheet 2

INVENTOR.
EMIL GOETZ
BY
ATTORNEYS

Patented June 13, 1944

2,351,330

UNITED STATES PATENT OFFICE 2,351,330

FOOD TREATING AND JUICE EXTRACTING APPARATUS

Emil Goetz, Detroit, Mich.

Application March 28, 1940, Serial No. 326,539

2 Claims. (Cl. 210—68)

This invention relates to juice extracting and masticating devices, having as its principal object the provision of an improved and simplified mechanism whereby the liquid constituents of foodstuffs and other materials may be extracted more quickly and completely than has heretofore been possible.

A further object is to provide such a machine which may readily be converted by the user into a device for pureeing fruits, vegetables and other foods, to render the pulp portions more readily digestible, as is frequently desirable in the feeding of infants and invalids.

A further object is to provide such a device which is of simple and sturdy construction, which may readily be disassembled for cleaning, and all of the parts of which are accessible and adapted to be completely and easily cleaned.

Still another object is to provide such a device having rotating parts which are completely balanced, and which is accordingly so smooth in operation as to eliminate objectionable vibration, and permit use of machine in a compact and portable construction which may be placed upon a table or the like, and which need not be permanently fastened in position.

A further object is the provision of such a machine which first reduces the matter under treatment to the form of a finely divided pulp, and then spreads the pulp in the form of a thin film upon a rapidly rotating centrifugal extractor in such manner that complete extraction of the juice is possible within a very short space of time.

Other objects and advantages will be apparent from the following description, wherein reference is made to the accompanying drawings illustrating preferred embodiments of my invention and wherein similar reference numerals designate similar parts throughout the several views.

In the drawings:

Figure 1 is a vertical and substantially diametric cross section of a juice extractor constructed in accordance with the principles of the present invention.

Figure 3:
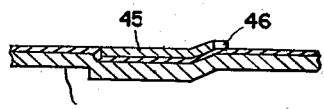
Figure 3 is a sectional detail taken substantially on the line 3—3 of Figure 2, and looking in the direction of the arrows.

Referring now to the drawings, it will be seen that the device is supported on a stand 10 having legs 12 of sufficient length to permit a pan as 14 to be placed under the machine. Centrally supported in the stand is an electric motor 15, having its shaft 17 projecting vertically upwardly into the space within a hood 20, which completely encloses the operating parts. The hood fits into the rim of an annular bowl 22, and is releasably held in place by spring snap fasteners 25. The annular bowl 22 surrounds the motor, and is provided with a discharge spout 23, toward which all portions of its bottom may be inclined to facilitate the discharge. The upper portion of the inner wall of the bowl assembly is formed as a removable frusto-conic baffle ring 28 which serves as a funnel and is positioned by means of radial fins 29 which overlie the bowl.

In the space within the hood 20 is a masticator and extractor drum assembly, secured to the shaft 17 and adapted to be rotated at high speed by the motor. An outer drum section 30 of the drum assembly comprises the extractor, and has a cylindrical wall in which are formed a large number of very fine perforations 32. The free edge of the drum 30 extends downwardly to a point adjacent and within the funnel-like frusto-conic wall 28. Extractor drum 30 is spacedly supported upon an inner drum 35 by means of studs 37, having undercut slots 38 therein adapted to engage key-hole shaped openings (undesignated) in the extractor drum, such openings being arranged in a manner to permit the extractor drum to be removed at will, and also being formed in such manner that the driving torque of the motor tends to maintain the extractor drum in position upon the studs.

The inner drum may also be provided with a cylindrical outer wall, arranged concentrically with the outer drum and slightly spaced therewithin, the flat web portion 39 of the inner drum being riveted or otherwise attached to a hub 40, which is in turn keyed to the shaft 17. The web of the outer drum 30 will be seen to extend inwardly from the studs 37 only a short distance, to provide clearance for the tubular filler neck 42 which, attached to the hood 20, projects downwardly through the open central portion of the outer drum and into close proximity to the top web or plate section of the inner drum.

Figure 2:
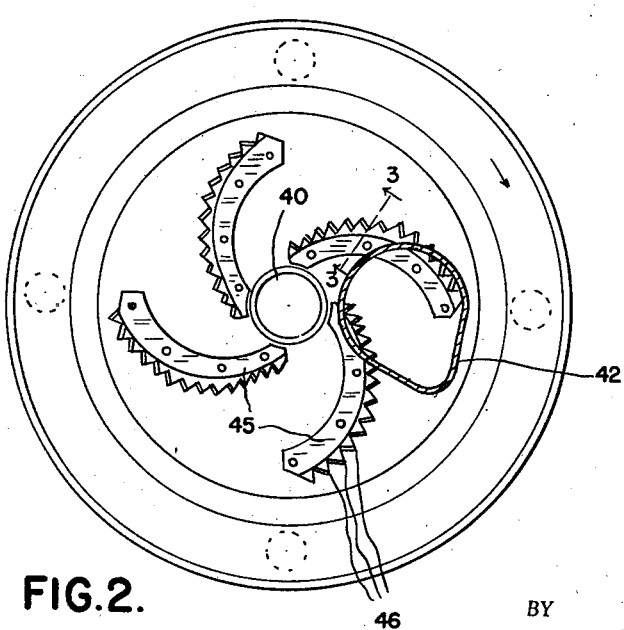
Figure 2 is a plan view of the masticator disc and adjacent parts.

Attached to the upper surface of the web 39 are a plurality of substantially segmental toothed masticating elements 45, formed of sheet metal and riveted or otherwise secured in place in such manner that the teeth 46 project rearwardly with respect to the direction of rotation of the drum. The teeth are also laterally pressed upwardly as indicated in Figure 3 in such manner that they project somewhat above the surface of the disc-like masticating assembly but substantially parallel thereto, while the greater portion of each masticating element lies flush with the surface of the disc. Due to the curvature of the masticating element, the teeth move laterally across the lower surface of material fed into engagement therewith through the filler neck. The cutting and abrading action of the teeth is such as to divide such material into a very fine pulp, from which the juice or liquid may very easily be extracted. The cross sectional contour of the filler neck 42, as shown in Fig. 2, is such that the material being worked upon is urged into and held between converging walls by the action of the rotating masticator assembly.

The rotation of the drum assembly drives the masticated material outwardly and thence downwardly in the narrow space between the drums 30, 35. The spacing of these drums is such as to spread the material between them in a thin film. Centrifugal force drives the liquid content of the pulp through the perforations 32, and against the interior of the hood 20, whence it flows downwardly into the trough 22 and outwardly through the spout 23 into any suitable collecting receptacle (not shown).

The pulp, after extraction of the liquid, falls through the funnel like interior of the frusto-conical wall 28, and into the receptacle 14.

A plug and feeder element 50 is preferably provided to assist in feeding the material to the masticator, and may be formed of wood, provided at its upper extremity with a knob-like handle 51. The inner extremity of the web of drum 30 may be flanged upwardly at an angle, as indicated at 31, to assist in directing the masticated material into the space between the drums.

Figure 5:
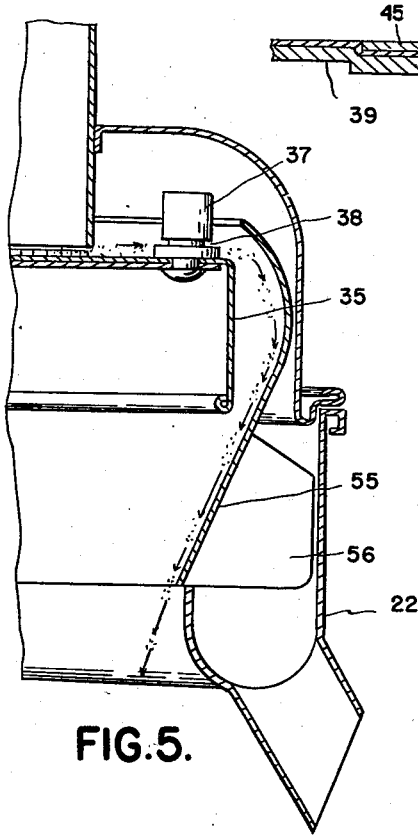
Figure 5 is a fragmentary sectional view taken substantially in the plane of Figure 1, but showing certain parts substituted and rearranged to convert the device to a pureeing machine.
Figure 4:
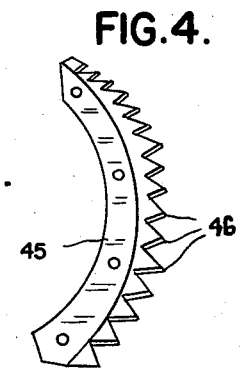
Figure 4 is a plan view of one of the masticating blades removed from the assembly.

If it is desired simply to reduce the material to a homogeneous pulp without extracting the juice, as in the manufacture of so-called predigested foods, it is merely necessary to remove the extractor drum 30, which is easily effected, after removal of the hood 20, by reason of the bayonet-like fastening provided by the key-hole slots and studs 37. The hood is of course replaced, and a special funnel 55 is provided to direct the material into a subjacent pan. The material is then simply pureed by the action of the teeth, and thrown outwardly from the top surface of inner drum 35. The funnel 55 replaces baffle 28, which is also removed during pureeing. The apparatus as thus rearranged appears as shown in Figure 5. Radial fins 56 projecting from the funnel 55 and overlying the inner wall of the annular trough-like bowl 22 serve to position the funnel.

Figure 6:
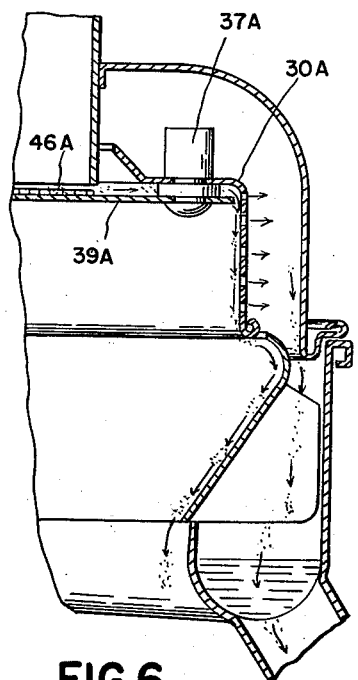
Figure 6 is a similar fragmentary sectional view showing a somewhat modified construction.

In the somewhat modified construction shown in Figure 6, the cylindrical outer flange is eliminated from the inner drum, which is thus formed as a simple disc 39a. This, in like fashion, serves to support, by means of studs 37a, a drum-like perforated extractor 30a. The diameter of the disc 39a is such that only a restricted opening is provided between its rim and the interior of the extractor drum. The material masticated by the teeth 46a is thus fed outwardly over the disc 39a and thence downwardly through the restricted annular space between this disc and the extractor drum. Such action will be seen to feed the pulp onto the drum in the form of a thin film, which is spread over the perforated area in such manner that the liquid content can most effectively be discharged through the perforations. In this embodiment, as in that first described, centrifugal force maintains the film of pulp upon the inner surface of the extractor drum, and the material is fed downwardly at a rate determined by the rate at which new material is fed at the top.

The electric wires through which current is supplied to the motor 15 are preferably incorporated in a cable 58 which extends to the motor through the hollow interior of the stand 10, a control switch 60 being connected in series with the motor to enable the latter to be started and stopped at will.

The use of the cylindrically flanged inner drum portion 35, as shown in Figure 1, rather than the simple disc 39a as shown in Figure 6, provides positive insurance against piling up of the material on the interior of the outside drum in any uneven manner, and provides even distribution of the comminuted material at a predetermined maximum thickness.

While it will be apparent that the illustrated embodiments of my invention herein disclosed are well calculated to adequately fulfill the objects and advantages primarily stated, it is to be understood that the invention is susceptible to variation, modification and change within the spirit and scope of the subjoined claims.

What I claim is:

1. In a centrifugal separator, in combination with a motor, a substantially flat feed plate rotatable thereby about a substantially certical axis, masticating means carried by the feed plate, means for feeding material to said feed plate and masticating means, a perforated extractor drum rotatable with the plate and having parts extending both above and below the same including a substantially cylindrical portion surrounding but spaced from the rim of the plate, and extending downwardly therefrom, said drum having a guide portion extending inwardly over and arranged relatively close to but spaced from the plate and joining the peripheral portion, said masticating means being located in such position that material masticated thereby is thrown outwardly into the space between said feed plate and said overhanging guide portion, and the rate of feed of the material to and along the extractor drum may be varied by varying the rate of feed to the masticating means.

2. In a centrifugal separator, in combination with a driving motor, a feed drum rotatable thereby about a substantially horizontal web portion and a substantially cylindrical rim portion connected to and extending downwardly from the web portion, an extractor drum secured to and rotatable with the feed drum and having a substantially cylindrical rim portion surrounding and slightly spaced from the rim portion of said feed drum, said extractor drum also having an overhanging guide portion connected to its rim portion and extending inwardly over the web portion of the feed drum but open at its center to expose a portion of said web portion of the feed drum, masticating means carried by the top of said web portion below said overhanging guide portion, and means for feeding material to said masticating means, said masticating means being adapted to throw such material outwardly into the space between said web and guide portion, the rim portion of the extractor drum being perforated to permit centrifugal separation during such downward passage.

EMIL GOETZ.